Figure 1:
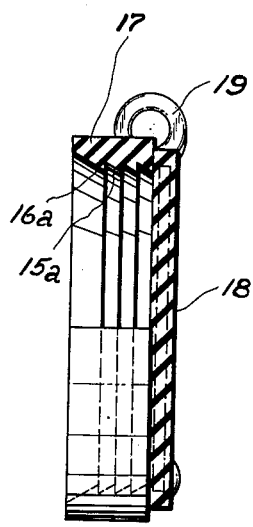

April 14, 1964   F. J. KRUMMEL   3,128,785
CHECK VALVE FOR RELATIVELY LARGE SIZE PIPES
Filed March 15, 1961

INVENTOR.
FREDERICK J. KRUMMEL
BY
*Dike, Thompson, Bronstein & Mrose*
ATTORNEYS.

3,128,785
CHECK VALVE FOR RELATIVELY LARGE
SIZE PIPES
Frederick J. Krummel, East St. Louis, Ill., assignor to Walworth Company, New York, N.Y., a corporation of Massachusetts
Filed Mar. 15, 1961, Ser. No. 96,000
5 Claims. (Cl. 137—315)

The present invention relates to check valves which are used to prevent flow in one direction of fluids in pipes, particularly pipes of relatively large size. Such fluids include sewage and the like. The bodies of such valves have upstream and downstream openings to which the corresponding pipes are connected, a nozzle with which the swinging valve member cooperates and an opening or port closed by a cover through which a valve member may be put in place when the valve is assembled or replacement is necessary. Being in more than one piece such bodies are subject to leakage if not properly installed and maintained. The bodies of such check valves are often made on an angle as this makes it easier to have a door or entrance for insertion of the swinging valve member. It is desirable to have the body made in a single piece, for instance from a casting and it is often important to have inlet and outlet openings opposite and in line with each other so that the check valve may also be used as a union.

I have discovered that by making the valve member and hinges of flexible material and integral with an attaching ring the whole unit may be folded in a reduced form and inserted through one of the pipe connection openings and attached by putting the ring on the nozzle. However, when made of such flexible material, the valve member is not stiff enough to operate satisfactorily and will spring and leak, especially under substantial pressures. If reinforced by a metal plate, either as a backing or molded into the valve member, the size of the valve member is limited by the size of the pipe connection opening through which the unit must be inserted.

I have discovered that by making the reinforcing plate in two pieces and using a pair of hinges to connect the valve member to the ring and imbedding the plates in the material of the check valve itself, the valve member may be folded along a line axially and located midway between the two hinge members. The whole unit may be folded and inserted through an opening smaller than the size of the check valve itself when it is open and in its normal condition.

As a means of attaching the valve member to the nozzle, which being inside the body of the check valve is difficult to get at, I provide the outside of the nozzle with a series of grooves and sharp-edged serrated ridges preferably of a ratchet shape. The ring can then be forced onto the nozzle comparatively easily, but on account of the shape of the ridges, can be removed only with difficulty. In practice I also provide the inside surface of the ring with similar grooves and ridges. Accordingly, my present invention includes not only the valve with the combined ring, but also the check valve unit which can be folded and thus inserted.

Figure 2:
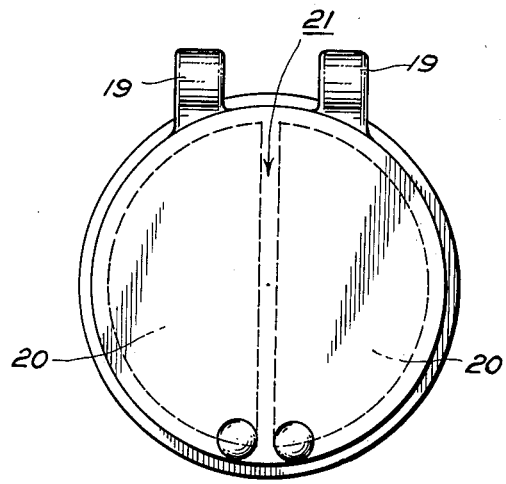
Figure 3:
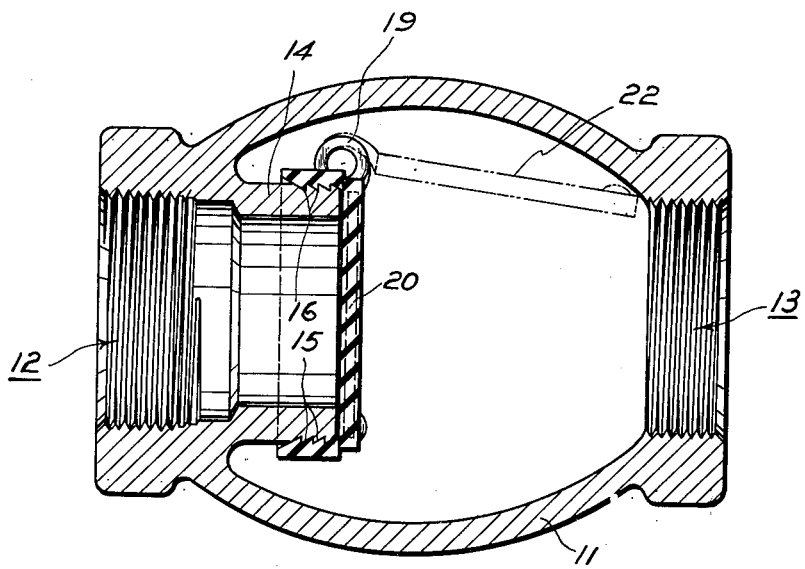

Referring now to the drawing:
FIG. 1 is a sectional view of the check valve unit embodying my invention.
FIG. 2 is a top plan view of the unit shown in FIG. 1.
FIG. 3 is a section of the valve body with the check valve unit in place on the interior nozzle.

Referring to the drawings, at 11 is shown the body unit which is ordinarily a casting having an inlet opening 12 at the left hand end and an outlet opening 13 on the opposite side, the two openings being preferably, though not necessarily, in line with each other. Within the body 11 is a nozzle 14 which projects inwardly and is provided with alternating grooves and ridges 15 and 16 as shown in FIG. 3. The ridges 16 are preferably ratchet shape in cross section with the slope toward the base of the nozzle 14. The check valve unit itself consists of a ring 17 and a valve member 18 hinged thereto by hinges 19 which are annular and nearly fully circular when viewed sidewise. This shape gives additional flexibility and the material gives the necessary resiliency so that the valve member tends to return to closed position. These hinges are spaced laterally from each other as shown in FIG. 2. The ring 17 hinges 19 and valve member 18 are molded from a single piece of suitable elastomeric material, for instance of rubber, and the whole unit is somewhat flexible. The inside surface of the ring 17 is formed with grooves and ridges 15a and 16a, respectively, corresponding to those on the exterior of the nozzle 14.

In order to stiffen and reinforce the valve member 18 and yet have it larger than the opening 13 through which the unit must be inserted to be put in place, I imbed in it two metal plates 20 which are segmental in shape, and these plates are separated from each other by an area 21 which contains no reinforcement and therefore is capable of being bent. This area 21 is diametrical and symmetrical with the center line between the pair of hinges. Accordingly, the valve member may be folded along the area 21 and thereby rendered small enough to pass through the inlet opening 13 even though the opening is smaller than the normal unfolded size of the valve member itself. Accordingly, to assemble the valve unit with the body 11, the ring 17 and valve member 18 are folded along the line 21 and in this folded condition are pushed through the inlet opening 13 of the valve body. The ring 17 springs the inlet opening 13 of the valve body. The ring 17 springs back to its original form and then can be pushed onto the end of the nozzle 14 where the grooves and ridges 15a and 16a hold it firmly in place. In operation, the valve member 18 may be deflected to the wide-open position shown by dashed linework 22. From the foregoing it will be seen that the valve unit embodying my invention has the very great advantage that no mechanical fastenings are necessary to secure the check valve in place and there is little possibility of wear reducing the efficiency of the valve. The check valve i.e. and the interior of the valve unit can also be used as a coupling in a straight line.

I claim:
1. A hollow valve body within which is an inwardly projecting nozzle, said valve body having a pipe connection opening opposite said nozzle and being in combination with a one-piece check valve unit of flexible resilient material, said check valve unit including as integral parts thereof a ring larger than the pipe connection opening and capable of being placed on the nozzle, a check valve hinged to the ring by integral flexible hinge members and having a pair of reinforcing plates imbedded in and completely surrounded by the flexible resilient materials of said check valve, said plates being spaced from each other along a central line and separated by a flexible area of said material, the entire check valve unit including the ring and valve member being capable of being compressed to a size to be inserted through the pipe connection opening and the ring put in place on the nozzle.

2. The combination as in claim 1 in which the flexible hinge members are in the form of loops extending outwardly from the ring and valve member.

3. The combination as in claim 1 in which the nozzle is provided with alternating ridges and grooves on its outer surface, for engagement with the inner surface of the ring.

4. The combination as in claim 3 in which the inner surface of the ring is provided with alternating ridges and grooves for engagement with the ridges and grooves on the nozzle.

5. The one-piece check valve unit comprising an attaching ring of flexible resilient material, a check valve member including a substantially flat disk of flexible resilient material within which is imbedded and completely enclosed a pair of stiff metal reinforcing plates of segmental shape in substantially one plane and having their flat edges spaced side by side with an area of the flexible material between their adjacent edges, and flexible hinge means integral with said flexible material of said disk hinging said disk to said attaching ring, whereby said disk and attaching ring may be folded to permit insertion of said unit through a valve body opening smaller than the unfolded and uncompressed sizes of said disk and ring.

References Cited in the file of this patent

UNITED STATES PATENTS

| | | |
|---|---|---|
| 249,557 | Truesdell | Nov. 15, 1881 |
| 1,306,391 | Romanoff | June 10, 1919 |
| 1,438,161 | Zimmerman | Dec. 5, 1922 |
| 2,321,236 | Parkin | June 8, 1943 |
| 2,627,651 | MacGregor | Feb. 10, 1953 |
| 2,809,060 | Thompson | Oct. 8, 1957 |
| 2,834,097 | Eichenberg | May 13, 1958 |
| 2,864,394 | Hempel | Dec. 16, 1958 |
| 2,991,043 | Saar | July 4, 1961 |